No. 704,151. Patented July 8, 1902.
G. O. VENNER.
WHEEL FOR MOTOR VEHICLES.
(Application filed May 1, 1902.)
(No Model.)

Witnesses:
H. B. Davis.
J. L. Hutchinson.

Inventor:
Geo. O. Venner
by Noyes Hennman
Attys.

UNITED STATES PATENT OFFICE.

GEORGE O. VENNER, OF LAWRENCE, MASSACHUSETTS.

WHEEL FOR MOTOR-VEHICLES.

SPECIFICATION forming part of Letters Patent No. 704,151, dated July 8, 1902.

Application filed May 1, 1902. Serial No. 105,422. (No model.)

*To all whom it may concern:*

Be it known that I, GEORGE O. VENNER, of Lawrence, county of Essex, and State of Massachusetts, have invented an Improvement in Wheels for Motor-Vehicles, of which the following description, in connection with the accompanying drawings, is a specification, like characters on the drawings representing like parts.

My invention relates to a form of wheel for motor-driven vehicles which is provided with means for cushioning the wheel and preventing its slipping on the ground when power is applied thereto.

My invention consists in a wheel the rim of which is provided with a series of spring-pressed teeth which normally project beyond the bearing-surface of the tire of the wheel and each of which is adapted to be forced into the rim against the action of a spring as the weight of the vehicle is brought to bear on its projecting end.

For an understanding of my invention reference is made to the accompanying drawings, in which—

Figure 1:
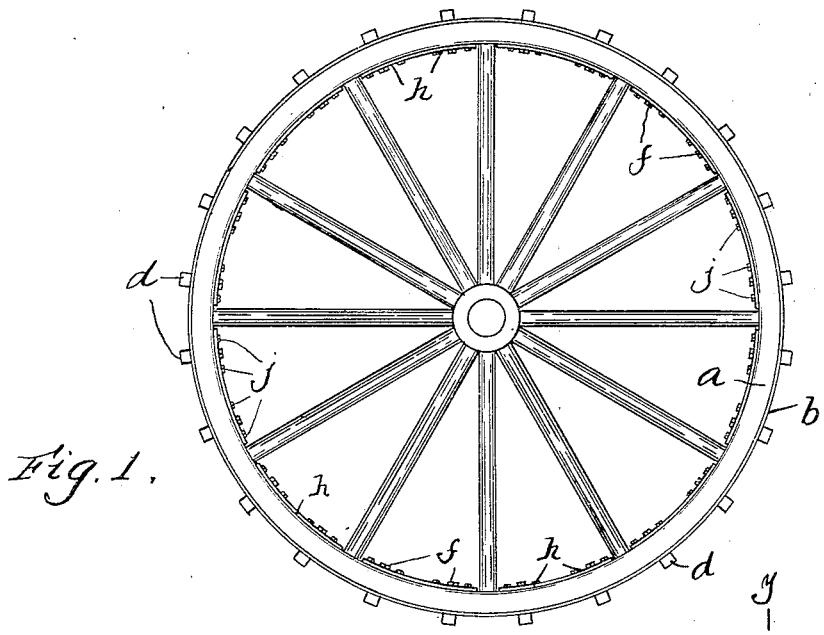
Figure 2:
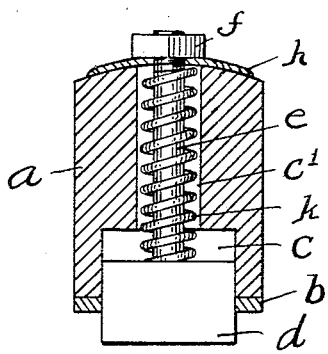
Figure 3:
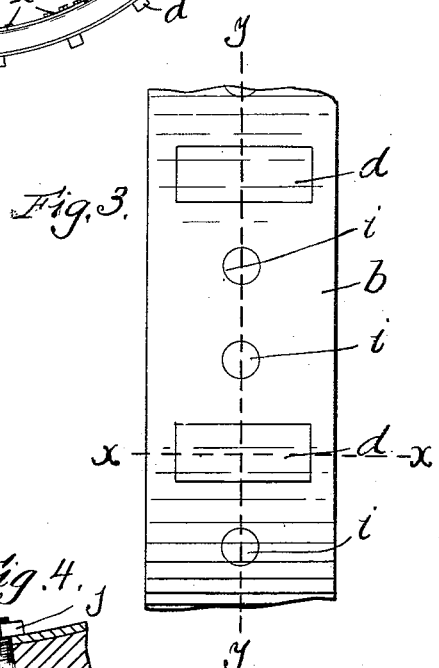
Figure 4:
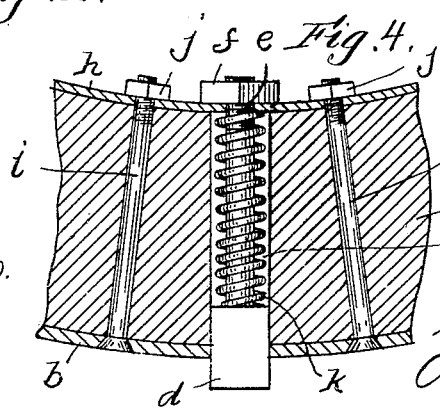

Figure 1 is a side elevation of a wheel made according to my invention. Fig. 2 is a detail view of one of the spring-pressed teeth, being a section on line $x$ $x$ of Fig. 3. Fig. 3 is an enlarged view of a segment of the tire. Fig. 4 is a cross-section on the line $y$ $y$ of Fig. 3.

As shown in Fig. 1, the wheel is of ordinary form, having the rim $a$ of wood and a tire $b$ of metal. A series of chambers $c$ are arranged at regular intervals in the face of the rim, each chamber having a centrally-arranged extension $c'$ of smaller diameter than the width of chamber $c$, which leads through the rim to its inner edge, as shown in Fig. 2, and the tire is also provided with apertures which register with the outer ends of the recesses $c$. A series of teeth $d$, of rectangular or oblong shape, are arranged in the outer ends of said chamber $c$, and said teeth are provided with round shanks $e$, which extend through the chambers $c'$ to the inner side of the rim, so that they protrude therethrough, the protruding ends thereof being threaded to receive nuts $f$. Stop-plates $h$ are bolted to the inner edge of the rim between each spoke by bolts which pass through the tire and rim, the heads of said bolts being countersunk in the tire, so that the top of said heads are flush with the surface of the tire and the nuts $j$ on the bolts being forced tight against plates $h$. The ends of said shanks $e$, passing through said plates $h$, and the nuts $f$ bear against the outer side thereof, as shown. A spring $k$ surrounds each shank $e$ and is interposed between the inner ends of each tooth $d$ and the inner side of its corresponding plate $h$, so that the springs act constantly to draw the nuts $f$ against the outer side of the plates $h$ and force the teeth $d$ a suitable distance beyond the surface of the tire, as shown. The depth of recesses $c$ is at least equal to the length of the teeth, so that they may be forced inwardly to such an extent that their outer ends will be flush with the surface of the tire. The tension or strength of the springs $k$ are preferably made to correspond with the weight of the vehicle on which the wheel is used.

In practice the projecting ends of the teeth will successively engage the ground and will hold the wheel from slipping when power is applied thereto. As each tooth approaches the vertical line through the center of the wheel the weight of the vehicle will gradually be brought to bear thereon and it will be forced inwardly until its outer end is nearly flush with the surface of the tire. The tension or strength of the spring of each tooth is preferably such that when a tooth passes said vertical center line the weight of the vehicle will not force it in flush with the surface of the tire, so that by suitably arranging the teeth the vehicle will at all times be supported by the springs, and its weight will at no time be actually borne by the tire. These spring-pressed teeth, therefore, not only prevent the slipping of the wheel when power is applied to it, but also provide a spring-cushion or yielding support for the vehicle at all times.

As the plates $h$ receive the full weight which is supported by the teeth, and as these plates are secured to the rim by the bolts $i$, which pass through the tire, it follows that the strain necessary to resist the inward thrust of the teeth is practically brought to bear on the tire.

It will be obvious that my invention is not limited to the use of any particular number of teeth; but I preferably place them close enough together to ordinarily prevent the tire from touching the ground.

Having thus described my invention, what I claim as new, and desire to secure by Letters Patent, is—

In combination with a wheel, of the rim, a metal tire surrounding the same, said rim having a series of chambers extending radially therethrough, a tooth located in each chamber, each tooth having an enlarged head which projects beyond the bearing-surface of the rim and having a shank which projects through the inner side thereof, a stop-plate through which said shank passes, bolts for securing said plate to the inner side of the rim which pass through said tire, rim and plate successively, the heads of said bolts engaging the outer side of the tire, nuts on said bolts which engage the opposite side of said plate from the rim, a spring which is interposed between said plate and said enlarged head, and a stop for limiting the outward movement of said tooth, substantially as described.

In testimony whereof I have signed my name to this specification in the presence of two subscribing witnesses.

GEORGE O. VENNER.

Witnesses:
 LOUIS H. HARRIMAN,
 JOHN P. S. MAHONEY.